United States Patent [19]

Ziche

[11] 3,997,508
[45] Dec. 14, 1976

[54] IMPROVEMENTS IN TREATMENT OF HIGH-MOLECULAR-WEIGHT WATER-SOLUBLE COMPOUNDS WITH GLYOXAL

[75] Inventor: Horst Ziche, Dusseldorf, Germany

[73] Assignee: Henkel & Cie G.m.b.H., Dusseldorf-Holthausen, Germany

[22] Filed: Mar. 25, 1975

[21] Appl. No.: 561,941

[30] Foreign Application Priority Data

Mar. 30, 1974 Germany ............................ 2415556

[52] U.S. Cl. .............................. 260/72 R; 106/187; 252/363.5; 260/73 R; 536/3; 536/43; 536/47; 536/52
[51] Int. Cl.$^2$ .................. C08B 11/00; C08B 15/00; C08B 31/00; C08G 12/22; C08F 8/28
[58] Field of Search ............... 252/363.5, 232, 233, 252/233.3 A, 67 R, 67 UA, 231 CM, 209 R, 230, 229, 209.6; 106/187; 260/73 R, 72 R

[56] References Cited

UNITED STATES PATENTS

| | | | |
|---|---|---|---|
| 2,379,555 | 7/1945 | Walker | 260/67 R |
| 2,879,268 | 3/1959 | Jullander | 260/232 |
| 3,072,635 | 1/1963 | Menart et al. | 260/232 |
| 3,297,583 | 1/1967 | Dierichs et al. | 106/187 |
| 3,356,519 | 12/1967 | Chambers et al. | 260/232 |
| 3,372,156 | 3/1968 | Schwarzer et al. | 260/232 |
| 3,461,115 | 8/1969 | Schwarzer | 260/232 |
| 3,489,719 | 1/1970 | Savage et al. | 260/232 |

*Primary Examiner*—Benjamin R. Padgett
*Assistant Examiner*—T. S. Gron
*Attorney, Agent, or Firm*—Hammond & Littell

[57] ABSTRACT

A process for the manufacture of finely-powdered, water-soluble without formation of lumps, high-molecular weight compounds, preferably modified natural polymers, comprising dry mixing the finely-powdered high-molecular weight compounds to be treated with from 0.2% to 5% by weight of polyglyoxal, heating said dry mixture to from 50° to 150° C, and recovering a product which is finely-powdered and water-soluble without formation of lumps.

8 Claims, No Drawings

IMPROVEMENTS IN TREATMENT OF HIGH-MOLECULAR-WEIGHT WATER-SOLUBLE COMPOUNDS WITH GLYOXAL

THE PRIOR ART

It has been known for a long time to treat high-molecular-weight, water-soluble substances with glyoxal. The glyoxal treatment which is applied, for instance, to cellulose ethers, such as methyl cellulose, hydroxyethyl cellulose, hydroxypropyl cellulose, and to poly-vinyl alcohol, and the like, is supposed to change the properties of the treated product so that no caking or lumping occurs when these products are stirred into water. One known process required that during the processing, the water-soluble, high-molecular substances are kneaded with an aqueous solution. After the subsequent drying and grinding, products are obtained which show a different dissolving behavior, depending upon their particle size. In the case of those of very fine grain, such as in the case of methyl cellulose, there is no guarantee that the formation of lumps is avoided whereas in the case of those of coarser grain, the solution rate is reduced to a considerable extent. In another widely-known method, the glyoxal treatment can be carried out after drying in that either an acidic glyoxal solution is sprayed on the product or that suspensions in organic solvents are utilized for carrying out the treatment. The use of the relatively strongly acidic glyoxal solutions causes problems with respect to corrosion or discoloration whereas the use of organic solvents requires explosion-proof installation. Some of these processes are described in U.S. Pat. Nos. 3,297,583, 3,347,847 and 3,350,386, for example.

OBJECTS OF THE INVENTION

The present invention has as its object to find a process for the treatment with glyoxal which does not show the above-described drawbacks and which is especially suited for very fine-grained powders of readily water-soluble, high-molecular-weight substances.

Another object of the present invention is the development of a process for the manufacture of glyoxal-treated, finely-powdered, water-soluble without formation of lumps, high-molecular-weight compounds consisting essentially of dry mixing finely-powdered, water-soluble, high-molecular-weight compounds with from 0.2% to 5% by weight of polyglyoxal, heating said dry mixture to from 50° to 150° C for at least 30 minutes, and recovering said glyoxal-treated, finely-powdered and water-soluble without formation of lumps, high-molecular weight compounds.

A further object of the present invention is the development in the process for the treatment of water-soluble, powdered high-molecular-weight compounds with glyoxal comprising contacting water-soluble, powdered high-molecular-weight compounds having reactive hydrogen atoms with a reactant media supplying glyoxal under conditions whereby some reaction between said reactive hydrogen atoms and glyoxal occurs and recovering the reaction product, the improvement consisting of dry-mixing said finely-powdered, water-soluble, high-molecular-weight compounds with from 0.2 to 5% by weight of polyglyoxal, as said reactant media supplying glyoxal, and heating said dry mixture to from 50° to 150° C for at least 30 minutes.

These and other objects of the present invention will become more apparent as the description thereof proceeds.

DESCRIPTION OF THE INVENTION

The present invention is characterized in that the finely-powdered substances to be treated are dry-mixed with 0.2% to 5% by weight of polyglyoxal and that the mixture is heated to 50° to 150° C for at least 30 minutes. The total heating time is preferably between ½ and 12 hours. Preferably, the mixtures are heated to 60° to 120° C, more particularly to 70° to 110° C, for one to four hours. The mixing step can be carried out separately from the heating step, especially when small quantities are processed. When larger quantities are treated, the use of heated mixing vessels is recommended.

The so-called polyglyoxal is an oligomeric form of glyoxal hydrate. In general, the commercial products are mixtures consisting of 5 to 10 glyoxal hydrate units, and contain about 80% glyoxal.

More particularly, the present invention relates to a process for the manufacture of glyoxal-treated, finely-powdered, water-soluble without formation of lumps, high-molecular-weight compounds consisting essentially of dry mixing finely-powdered, water-soluble, high-molecular-weight compounds with from 0.2% to 5% by weight of polyglyoxal, heating said dry mixture to from 50° to 150° C for at least 30 minutes, and recovering said glyoxal-treated, finely-powdered and water-soluble without formation of lumps, high-molecular-weight compounds.

The process of the invention can be applied to natural or synthetic water-soluble high-polymers, especially to modified natural high-polymers. These polymers are finely-divided water-soluble, high-molecular-weight polymeric compounds having large amounts of reactive hydrogen atoms, such as derived from hydroxyl groups, carboxylic acid groups or amine groups.

Suitable materials are guar flour (galactomannans), water-soluble starch, xanthan gum, water-soluble alginates, polyvinyl alcohol, polyacrylamide, methyl cellulose, methyl hydroxypropyl cellulose, hydroxyethyl cellulose, hydroxypropyl-hydroxyethyl cellulose, carboxymethyl cellulose, and methyl carboxymethyl cellulose. In principle, the process according to the invention can be applied to all known water-soluble macromolecular substances. It is especially applicable to the above-cited substances which have particle sizes below 0.2 mm and preferably below 0.1 mm diameter, i.e., in the case of so-called dust-like products. It is easy to control this process, hence, the manufacturer of the modified water-soluble natural polymers is enabled to prepare a product having a definite solution property or solution rate by using an exactly defined glyoxal treatment in the solid state. These conditions, within the given limits within which optimal results can be achieved, are easily established by the expert in the art by conducting a few simple tests.

The following examples are illustrative of the practice of the invention without being limitative in any respect.

EXAMPLES

The polyglyoxal used in the following Examples is a so-called 80% commercial product. The mixtures were prepared in a conventional laboratory mixer and then heated in an oven for the indicated time.

EXAMPLE 1

The methyl cellulose used had a Höppler viscosity of 5000 cP (2% solution at 20° C), a methyl content of 26%, and a particle size of less than 0.2 mm for 99% of its particles. 98 gm of this methyl cellulose was dry-mixed with 2 gm of polyglyoxal (80%) and then heated to 80° C for two hours.

It was possible to scatter the product on stationary water (having a pH of 7) without lumping, and then to distribute it homogeneously. After 10 minutes, the viscosity started to increase, i.e., the material started to swell. When, after the dispersion of the substance, the pH of the mixing water was adjusted to 8 by the addition of dilute ammonia, the methyl cellulose dissolved immediately.

EXAMPLE 2

The purified carboxymethyl cellulose used had a substitution degree of 0.7, a Höppler viscosity of 200 cP (2% solution at 20° C) and a particle size of less than 0.2 mm for 95% of its particles. 98 gm of this carboxymethyl cellulose was thoroughly mixed with 2 gm of polyglyoxal (80%) and then heated to 100° C for three hours.

In contrast to the non-treated carboxymethyl cellulose, the product thus prepared could be dispersed in water without lumping and immediately be dissolved by the addition of sufficient substances having an alkaline effect to give a pH of 8 to 9.

EXAMPLE 3

98.5 gm of a swellable wheat starch (having a particle size of less than 0.2 mm for 75% of its particles) was mixed with 1.5 gm of polyglyoxal (80%) and then heated to 100° C for three hours.

Then, in contrast to the untreated starch, the treated starch could be easily dispersed in water without lumping. The solubility lag of the treated starch in water could be removed by adjusting the pH to 8 to 9.

EXAMPLE 4

The sodium alginate used had a Höppler viscosity of 1500 cP (2% solution at 20° C) and a particle size of less than 0.2 mm for 70% of its particles. 98.0 gm of this sodium alginate was dry-mixed with 2 gm of polyglyoxal (80%) and then heated to 100° C for 2½ hours.

The thus-treated product is easy to disperse in water and after it has been introduced into water, rapid dissolution is observable when the pH is adjusted to 8 to 9. It was very difficult to dissolve the starting material because of the formation of lumps.

EXAMPLE 5

99 gm of commercial pulverulent guar flour was dry-mixed with 1 gm of polyglyoxal (80%) and then heated to 90° C for two hours. After this treatment, the guar flour could be dispersed and dissolved in water free of lumps.

The preceding specific embodiments are illustrative of the practice of the invention. It is to be understood, however, that other expedients known to those skilled in the art, or described herein, may be employed without departing from the spirit of the invention or the scope of the appended claims.

I claim:

1. A process for the manufacture of glyoxal-treated, finely-powdered, water-soluble without formation of lumps, high-molecular-weight polymeric compounds consisting essentially of dry mixing finely-powdered water-soluble, high-molecular-weight polymeric compounds having particle sizes below 0.2 mm diameter and large amounts of reactive hydrogen atoms with from 0.2% to 5% by weight of a commercial polyglyoxal consisting of 5 to 10 glyoxal hydrate units and containing about 80% glyoxal, heating said dry mixture to from 60° C to 120° C for at least 30 minutes and recovering said glyoxal-treated, finely-powdered and water-soluble without formation of lumps, high-molecular-weight polymeric compounds.

2. The process of claim 1 wherein said dry mixture is heated for a period of ½ to 12 hours.

3. The process of claim 1 wherein said dry mixture is heated for a period of 1 to 4 hours.

4. The process of claim 1 wherein said dry mixture is heated to 70° to 110° C for from 1 to 4 hours.

5. The process of claim 1 wherein said finely-powdered, water-soluble, high-molecular-weight compounds have an average particle size of below 0.1 mm in diameter.

6. In the process for the treatment of water-soluble, powdered high-molecular-weight polymeric compounds with glyoxal comprising contacting water-soluble, powdered high-molecular-weight polymeric compounds having particle sizes below 0.2 mm diameter and large amounts of reactive hydrogen atoms with a reactant media supplying glyoxal under conditions whereby some reaction between said reactive hydrogen atoms and glyoxal occurs and recovering the reaction product, the improvement consisting of dry mixing said finely-powdered, water-soluble, high-molecular-weight polymeric compounds with from 0.2 to 5% by weight of a commercial polyglyoxal consisting of 5 to 10 glyoxal hydrate units and containing about 80% glyoxal, as said reactant media supplying glyoxal, and heating said dry mixture to from 60° to 120° C for at least 30 minutes.

7. The process of claim 1 wherein said water-soluble, high-molecular-weight polymeric compounds are selected from the group consisting of guar flour, water-soluble starch, xanthan gum, water-soluble alginates, polyvinyl alcohol, polyacrylamide, methyl cellulose, methyl hydroxypropyl cellulose, hydroxyethyl cellulose, hydroxypropyl-hydroxyethyl cellulose, carboxymethyl cellulose, and methyl carboxymethyl cellulose.

8. The process of claim 6 wherein said water-soluble, high-molecular-weight polymeric compounds are selected from the group consisting of guar flour, water-soluble starch, xanthan gum, water-soluble alginates, polyvinyl alcohol, polyacrylamide, methyl cellulose, methyl hydroxypropyl cellulose, hydroxyethyl cellulose, hydroxypropyl-hydroxyethyl cellulose, carboxymethyl cellulose, and methyl carboxymethyl cellulose.

* * * * *